United States Patent [19]
Wallace

[11] 4,293,135
[45] Oct. 6, 1981

[54] SEGMENTED SEAL

[75] Inventor: Joseph E. Wallace, Calabasas, Calif.

[73] Assignee: Parker-Hannifin Corporation, Cleveland, Ohio

[21] Appl. No.: 124,391

[22] Filed: Feb. 25, 1980

[51] Int. Cl.³ .............................................. F16J 15/02
[52] U.S. Cl. .......................................... 277/9; 277/1; 277/199; 49/482; 49/483
[58] Field of Search .................... 277/1, 9, 9.5, 166, 277/192, 199, 207 R; 49/482, 483

[56] References Cited

U.S. PATENT DOCUMENTS

| | | | |
|---|---|---|---|
| 1,986,465 | 1/1935 | Dempsey | 49/482 X |
| 2,722,043 | 11/1955 | Nenzell | 277/9 X |
| 3,175,832 | 3/1965 | Carrell | 277/199 |
| 3,738,670 | 6/1973 | Jelinek et al. | 277/199 |

FOREIGN PATENT DOCUMENTS 1162287  4/1958  France ................................ 277/166

*Primary Examiner*—Robert S. Ward, Jr.
*Attorney, Agent, or Firm*—James A. Baker

[57] ABSTRACT

A sectional gasket 11 includes corner junction members 12, straight junction members 13, and extension members 14. The junction members 12 and 13 each include a recess 19, and the recesses 19 each include axially extending laterally inwardly facing sealing surfaces 20 and 21. The extension members 14 each have a uniform lateral cross-sectional configuration along their entire axial extent. Each extension member 14 includes axially extending, parallel, laterally outwardly facing sealing surfaces 25 and 26. The sealing surfaces 25 and 26 extend continuously and without interruption along the entire axial extent of the extension member 14. The extension members 14 are characterized by the absence of any special tongue and recess at their opposite ends, and the extension members 14 are manufactured and stored in long continuous strips which are cut to the desired length and used in combination with the junction members 12 and 13 by the end user of the gasket 11.

9 Claims, 5 Drawing Figures

SEGMENTED SEAL

BACKGROUND OF THE INVENTION

This invention relates generally to gaskets, and more particularly to sectional gaskets which include several members joined together to provide a gasket structure.

When relatively large gasket structures are to be utilized, sectional gaskets provide certain advantages with respect to manufacture, storage and handling. Additionally, sectional gaskets can be used to provide a variety of gasket shapes and sizes by joining gasket sections together in different combinations.

One prior art sectional gasket is shown in U.S. Pat. No. 3,738,670, which is incorporated herein by reference. In this prior art sectional gasket, the gasket includes junction members and extension members which are assembled together to provide a gasket structure. The junction members and extension members each include a tongue at one end and a recess at the other end, and the tongues and recesses are joined together to provide a fluid-tight connection. Other prior art sectional gaskets are shown in U.S. Pat. Nos. 1,986,465 and 3,175,832. In these prior art sectional gaskets, tongues and recesses of the dove-tail or bulb type are utilized between the junction members and the extension members.

SUMMARY OF THE INVENTION

The present invention departs from these and other prior art sectional gaskets by providing a sectional gasket that eliminates the need for a tongue and a recess at opposite ends of each gasket member. This is accomplished according to the present invention by providing junction members that have recesses at both of their opposite ends and by providing extension members that are of uniform cross-sectional configuration along their entire axial extent. By this arrangement, the extension members do not have to be provided with a special tongue and recess at their opposite ends, so that the extension members can be manufactured and stored in long continuous strips, and the strips can then be cut to the desired length and used in combination with the junction members by the end user of the gasket.

More specifically, the invention provides a sectional gasket which includes junction members and extension members, wherein the opposite ends of the junction members are each provided with a recess having parallel laterally inwardly facing sealing surfaces spaced a predetermined distance apart. The extension members include parallel laterally outwardly facing sealing surfaces spaced a predetermined distance apart, and the sealing surfaces extend continuously and without interruption along the entire axial extent of the extension members. In this manner, the extension member does not have to be formed with a special recess and a special tongue at its opposite ends, and the extension member can be laterally severed at any location along its entire length and sealingly inserted into the recess of the junction member.

BRIEF DESCRIPTION OF THE DRAWINGS

These and other aspects and advantages of the invention are incorporated in the preferred embodiment of the invention shown in the drawings, wherein.

DETAILED DESCRIPTION OF THE DRAWINGS

Figure 1:
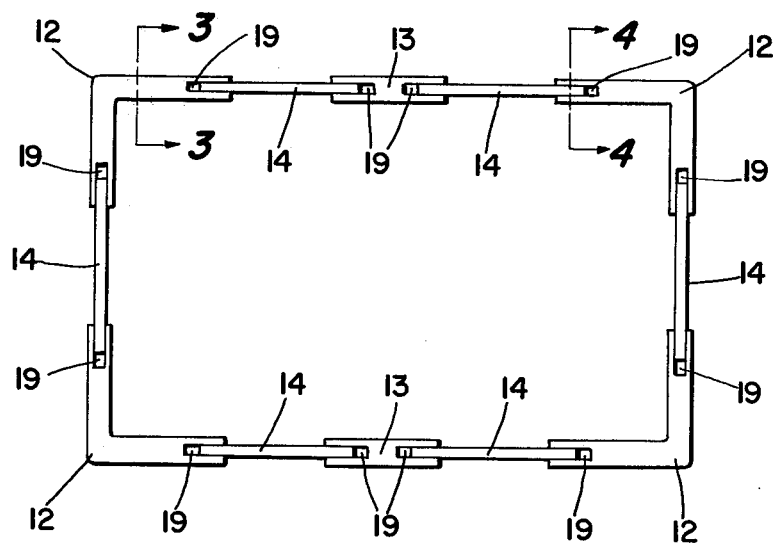
FIG. 1 is a top plan view of a gasket according to the principals of the invention.

Referring now to the drawings in greater detail, FIG. 1 shows a gasket 11 which includes corner junction members 12, straight junction members 13, and extension members 14.

Figure 3:
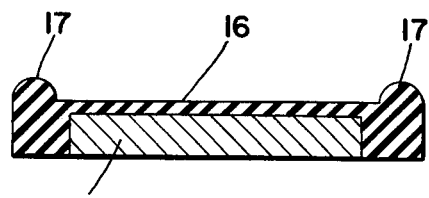
FIG. 3 is an enlarged cross-sectional view taken along line 3—3 in FIG. 1.
Figure 4:
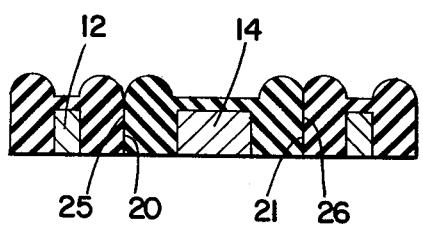
FIG. 4 is an enlarged cross-sectional view taken along line 4—4 in FIG. 1.

As shown in FIGS. 3 and 4, each of the members 12, 13 and 14 is of a generally thin, flat, axially extending shape. Each member 12, 13 and 14 is made of a relatively rigid, flat, elongated base member 15 of rectangular lateral cross-sectional configuration. The base member 15 is of steel in the preferred embodiment and is covered on three of its sides with a rubberlike or resilient material 16. The resilient material 16 is a synthetic rubber such as butyl rubber or nitrile in the preferred embodiment, and the synthetic rubber is molded in place and cured on the base member 15 in a well known manner. The resilient material 16 includes an outwardly projecting lip portion 17 which extends wihtout interruption along the entire top peripheral edge of the members 12, 13 and 14, with the sole exception of the ends of the extension members 14 as described more fully below.

Figure 2:
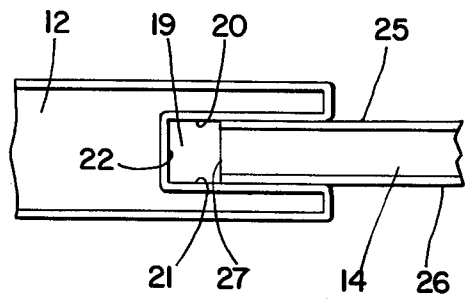
FIG. 2 is an enlarged view of the connection between one of the junction members and one of the extension members shown in FIG. 1.

The junction members 12 and 13 each include a center region and two end regions, and each end region includes a recess 19. As best shown in FIG. 2, each recess 19 includes parallel, axially extending, laterally inwardly facing sealing surfaces 20 and 21 spaced a predetermined lateral distance apart. The sealing surfaces 20 and 21 extend axially continuously and without interruption from the free end of the junction member and terminate at an end wall 22.

As best shown in FIGS. 2 and 4, the extension members 14 each have a uniform lateral cross-sectional configuration along their entire axial extent. Each extension member 14 includes parallel, axially extending, laterally outwardly facing sealing surfaces 25 and 26. The sealing surfaces 25 and 26 are spaced a predetermined lateral distance apart and extend continuously and without interruption along the entire axial extent of the extension member 14. The extension member 14 terminates at a lateral end face 27, and the end face 27 is not covered by the resilient material 16 and is not provided with a lip 17 along its top peripheral surface.

When the members 12, 13 and 14 are to be used together to provide a gasket 11, the junction members 12 and 13 are manufactured and stored in the configuration shown in the drawings. The extension members 14, however, are manufactured in strips that are substantially longer than the length of the members 14 shown in FIG. 1 and are shipped to the end user in such elongated strips. In the preferred embodiment, the length of these strips is two to ten times the length of the longest one of the extension members 14 shown in FIG. 1, so that at least two extension members can be made from each strip. The end user then cuts the elongated strips to the desired length for use in the gasket 11. This eliminates the need for producing tongues and sockets at opposite ends of the extension members 14, and eliminates the need for manufacturing and storing different lengths of the extension members 14 for making different sizes and shapes.

Figure 5:
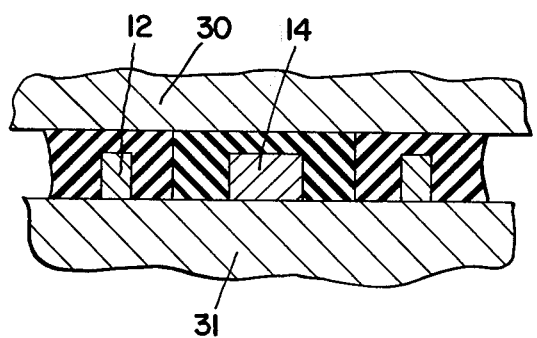
FIG. 5 is a cross-sectional view corresponding to FIG. 4 but showing the gasket clamped between parts to be sealed.

When the gasket 11 is assembled in the manner shown in FIG. 1, each extension member 14 is received with an interference fit in the recesses 19 of the adjacent junction members. When this occurs, the sealing surfaces 20 and 25 engage with sealing contact, and the sealing surfaces 21 and 26 engage with sealing contact, to provide a primary and a secondary seal against fluid leakage. As shown in FIG. 5, the seal 11 is placed between members 30 and 31, and the members 30 and 31 are clamped together to deform the lips 17 into tight sealing engagement with each other so that there is no gap between adjacent lips 17 at a location between the members 30 and 31.

What is claimed is:

1. A sectional gasket comprising a junction member, an extension member, said junction member having a center region and two end portions, said end regions each having a recess, said recesses each having parallel laterally inwardly facing sealing surfaces spaced a predetermined distance apart, and said extension member having parallel laterally outwardly facing sealing surfaces spaced a predetermined distance apart and extending continuously along its entire axial extent, whereby said extension member is adapted to be laterally severed at any location along its entire axial extent and sealingly received in one of said recesses.

2. A sectional gasket according to claim 1, wherein said predetermined distance between said sealing surfaces of said extension member is greater than said predetermined distance between said sealing surfaces of said recess, whereby said extension member is adapted to be received in said recess with an interference fit.

3. A sectional gasket according to claim 1, wherein said sealing surfaces of said extension member and said sealing surfaces of said recess are each resilient.

4. A sectional gasket according to claim 1, wherein said junction member and said extension member each include a rigid base and a resilient cover, and each of said sealing surfaces is defined by said cover.

5. A sectional gasket according to claim 4, wherein said rigid base of said extension member includes an axially facing lateral end surface, and said end surface is exposed over its entire lateral extent.

6. A sectional gasket comprising a first junction member, a second junction member, an extension member, said junction members each having an end region with a recess, said recesses each having parallel laterally inwardly facing sealing surfaces spaced a predetermined distance apart, said extension member having parallel laterally outwardly facing sealing surfaces spaced a predetermined distance apart, said sealing surfaces of said extension member extending continuously and without interruption along the entire axial extent of said extension member, said extension member being disposed between said first and second junction members, said sealing surfaces of said extension member being partially received within each of said recesses of said first and second junction members, and said sealing surfaces of said extension member sealingly engaging said sealing surfaces of said recesses.

7. A sectional gasket as set forth in claim 6, wherein said sealing surfaces of said junction members and said sides sealing surfaces said extension member are resilient.

8. A sectional gasket as set forth in claim 6, wherein said junction members and said extension member each include a rigid base and an elastomeric cover.

9. A sectional gasket comprising a first junction member, a second junction member, an extension member, said junction members each having an end region with a recess, said recesses each having parallel laterally inwardly facing sealing surfaces spaced a predetermined distance apart, said extension member having parallel laterally outwardly facing sealing surfaces spaced a predetermined distance apart, said sealing surfaces of said extension member extending continuously and without interruption along the entire axial extent of said extension member, said extension member being disposed between said first and second junction members, said sealing surfaces of said extension member being partially received within each of said recesses of said first and second junction members, said sealing surfaces of said extension member sealingly engaging said sealing surfaces of said recesses, said junction member and said extension member each having a rigid base and a resilient cover, said cover defining each of said sealing surfaces and including an outwardly projecting lip adjacent to and coextensive with each of said sealing surfaces said rigid base of said extension member including axially facing lateral end surfaces disposed in said recesses, and said end surfaces each being exposed over its entire lateral extent.

* * * * *

UNITED STATES PATENT AND TRADEMARK OFFICE
CERTIFICATE OF CORRECTION

PATENT NO. : 4,293,135
DATED : October 6, 1981
INVENTOR(S) : Joseph E. Wallace

It is certified that error appears in the above-identified patent and that said Letters Patent are hereby corrected as shown below:

In column 3, line 23, change "portions" to---regions---

Signed and Sealed this

First Day of December 1981

[SEAL]

Attest:

GERALD J. MOSSINGHOFF

*Attesting Officer*   *Commissioner of Patents and Trademarks*